United States Patent
Böhm et al.

[11] Patent Number: 5,857,395
[45] Date of Patent: Jan. 12, 1999

[54] APPARATUS FOR THE MANUFACTURE OF SHEETS OF CORRUGATED BOARD OF VARIABLE SIZE

[75] Inventors: Roman Böhm, Wernberg-Köblitz; Martin Grill, Mantel; Felix Titz, Weiherhammer; Karl Waldeck, Etzenricht, all of Germany

[73] Assignee: BHS Corrugated Maschinen- und Anlagenbau GmbH, Weiherhammer, Germany

[21] Appl. No.: 502,536

[22] Filed: Jul. 14, 1995

[30] Foreign Application Priority Data

Jul. 16, 1994 [DE] Germany .................. 44 25 155.6

[51] Int. Cl.$^6$ .................. B26B 11/00; B31B 1/14

[52] U.S. Cl. .................. 83/408; 83/449; 83/864; 493/342; 493/227; 493/237

[58] Field of Search .................. 83/408, 504, 446, 83/448, 343, 425.1, 425.2, 453.4, 100, 864, 865, 877, 879, 44, 45, 47, 51, 407, 663, 869, 885; 493/227, 230, 237–239, 189, 342, 361–366, 369, 370, 373, 378, 359, 287–289

[56] References Cited

U.S. PATENT DOCUMENTS

| | | | |
|---|---|---|---|
| 2,759,542 | 8/1956 | Weisshuhn | 83/408 |
| 4,007,652 | 2/1977 | Shinomiya et al. | 83/408 |
| 4,242,934 | 1/1981 | Coburn | 83/408 |
| 4,265,152 | 5/1981 | Corradi | 83/408 |
| 4,268,341 | 5/1981 | Huhne | 83/408 |
| 4,516,454 | 5/1985 | Mosburger | 83/425.4 |
| 4,549,452 | 10/1985 | Jobst | 83/105 |
| 5,031,494 | 7/1991 | Asselborn et al. | 83/100 |
| 5,393,294 | 2/1995 | Jobst | 83/47 |

FOREIGN PATENT DOCUMENTS

| | | |
|---|---|---|
| 0065014 | 11/1982 | European Pat. Off. . |
| 41 33 760 A1 | 11/1991 | Germany . |

*Primary Examiner*—Maurina T. Rachuba
*Attorney, Agent, or Firm*—Browdy and Neimark

[57] ABSTRACT

An apparatus for the manufacture of sheets of corrugated board of variable size comprises a cross cutter for severing the entire web of corrugated board disposed, in the conveying direction of a web of corrugated board, downstream of at least one longitudinal cutting arrangement, of cutting devices for cutting lateral margins and of discharge devices for the margins cut off, and upstream of at least one cross cutting arrangement for cutting sheets of corrugated board.

4 Claims, 2 Drawing Sheets

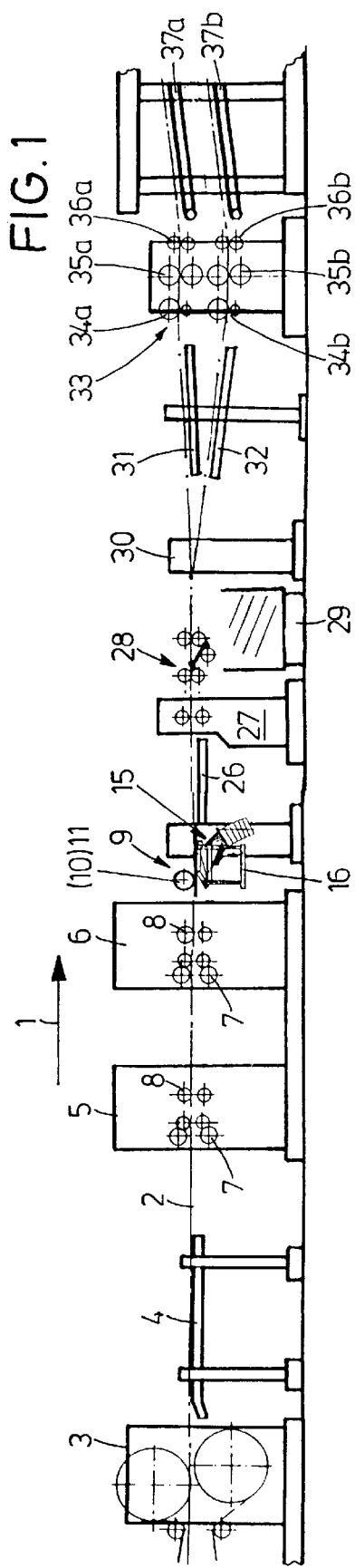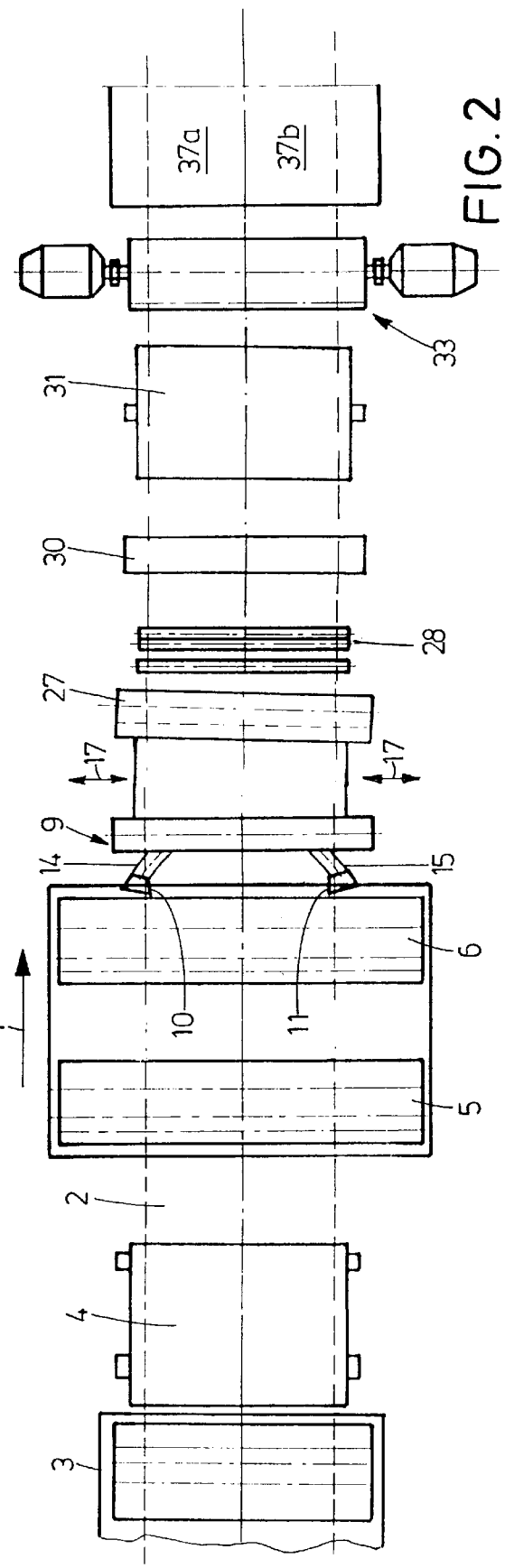

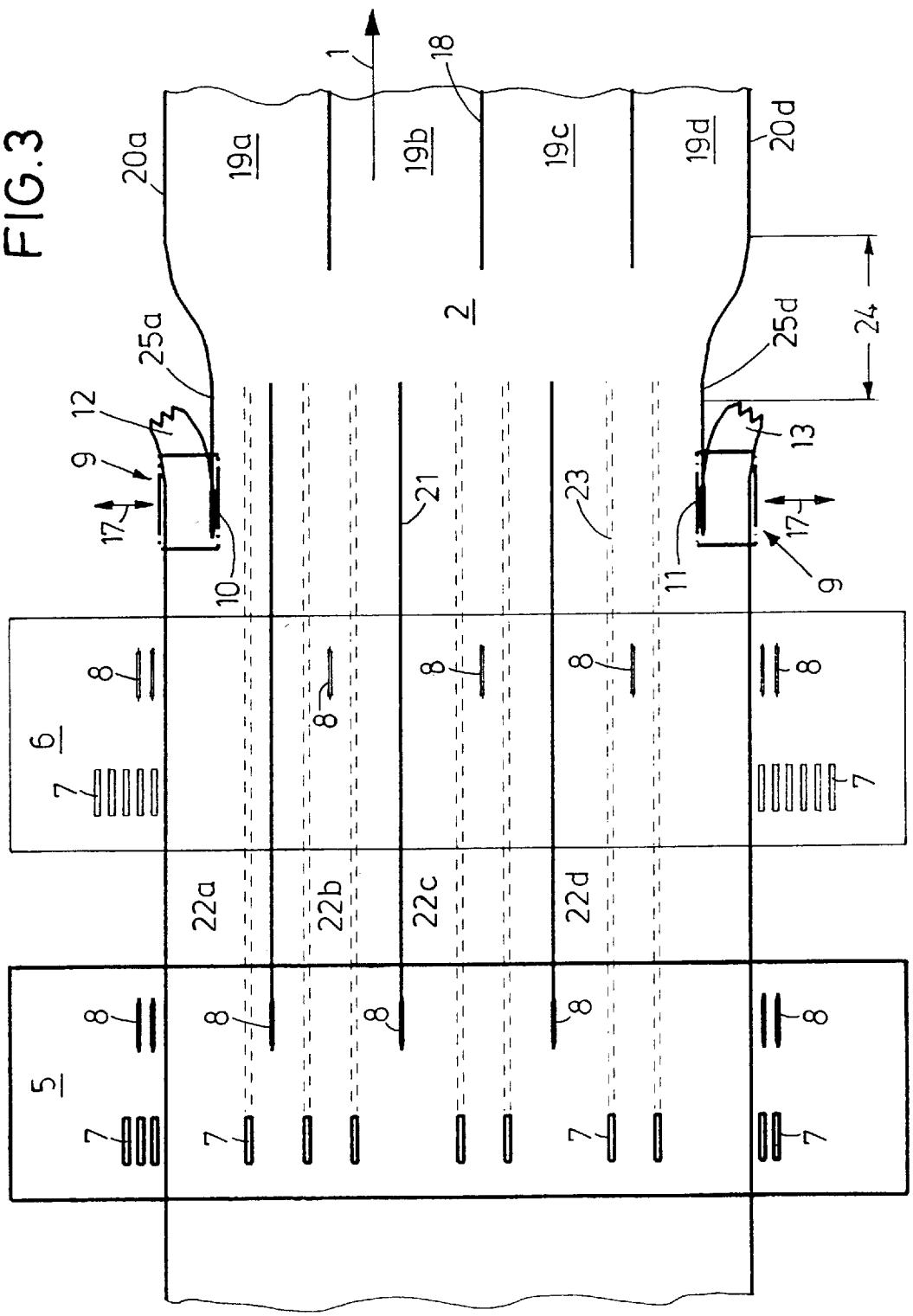

APPARATUS FOR THE MANUFACTURE OF SHEETS OF CORRUGATED BOARD OF VARIABLE SIZE

BACKGROUND OF THE INVENTION

1. Field of the Invention

The invention relates to an apparatus for the manufacture of sheets of corrugated board of variable size, comprising at least one longitudinal cutting arrangement having longitudinal cutters adjustable at right angles to the conveying direction of the nondivided web of corrugated board for cutting sectional webs of corrugated board of differing format width, cutting devices adjustable at right angles to the conveying direction of the web of corrugated board for cutting lateral margins of the web of corrugated board, discharge devices for margins that have been cut off, and at least one cross cutting arrangement for cutting sheets of corrugated board from the sectional webs of corrugated board.

2. Background Art

In an apparatus of the generic type known from U.S. Pat. No. 5,393,294, the at least one longitudinal cutting device is preceded by a cross cutting device for the margins. In the case of a change of size, i.e. in case the longitudinal cutting devices are adjusted to another format width of the sectional webs of corrugated board to be cut, then a cross cut is performed from both sides of the web. To this end, a corresponding cross cutting device is disposed upstream of the at least one longitudinal cutting device—referred to the, conveying direction of the web of corrugated board. The two lateral cross cuts exceed the widest margin to be severed. There is no cross cutting of the complete web upstream of the longitudinal cutting devices. The web of corrugated board can be conveyed without cross cutting in the conveying direction as far as to the cross cutter for the the sheets of corrugated board, the guidance and accurate conveying motion thus being maintained. The cuts of transverse and longitudinal extension are performed precisely and with positional accuracy. The portion of the corrugated board web that has overlapping formats during the change of size is cut out as waste by the cross cutter located at the end of the apparatus and discarded. It is of disadvantage that the margins must be cross cut and led anew into the discharge devices for every change of size, which may cause malfunction, given the high conveying speeds of the web of corrugated board. With this design, the cross cutting device used at the end for cutting the sheets of corrugated board from the sectional webs of corrugated board can only be a simplex cross cutting device, i.e. the individual sectional webs of corrugated board must have the same format length.

If sheets of corrugated board of different format length are to be produced, such an apparatus for the manufacture of sheets of corrugated board of variable size is configured such that—referred to the conveying direction—the at least one longitudinal cutting device is preceded by a cross cutter, by which the corrugated board web is divided over the entire width of the web. The remaining web is accelerated for a certain number of sheets so that a gap forms between the leading web and the following web of corrugated board. For a sufficiently long gap to result, a transfer table of corresponding length must be available between the cross cutter and the at least one longitudinal cutter. When, because of the gap, the leading web of corrugated board has left the longitudinal cutting device and the following web has not yet reached the latter, the longitudinal cutting devices and, if necessary, corrugating devices are adjusted to the new format width or widths, respectively. This has the disadvantage that the corrugated board web following in the conveying direction is not exposed to any traction and, therefore, not sufficiently guided. This may result in inaccuracies of cut by the cross cutter and inaccuracies of cutting by the longitudinal cutting device. Unnecessary waste and possibly malfunction in operation will result. This is especially troublesome with webs of corrugated board which are printed and must be cut true to size. Moreover, the acceleration of the leading web required for the gap to form will cause inaccuracies of cut.

SUMMARY OF THE INVENTION

It is the object of the invention to embody an apparatus of the generic type such that corrugated board webs of different format can be cut.

According to the invention, this object is attained in that seen in the conveying direction, a cross cutter for severing all the sectional webs of corrugated board is disposed downstream of the at least one longitudinal cutting arrangement, the cutting devices for cutting lateral margins and the discharge devices and upstream of the at least one cross cutting arrangement for the cutting of sheets of corrugated board. The cross cutter for severing all the sectional webs of corrugated board can be used to make only one severing cut so that the waste resulting from the change of format width is discarded downstream of the cross cutting arrangement for the cutting of the corrugated board webs. But the cross cutter may also serve to make two severing cuts so that the waste occasioned by the change of format width is cut out and discarded in a sheet sluice. As a result of this configuration, it is possible to have a duplex cross cutting arrangement follow up, by means of which sheets of corrugated board of different format length can be cut. The embodiment according to the invention further ensures the continuous cutting of margins in varying widths as result from the change of format width.

Further features, details and advantages of the invention will become apparent from the ensuing description of an examplary embodiment, taken in conjunction with the drawing.

BRIEF DESCRIPTION OF THE DRAWING

FIG. 1 is a diagrammatic illustration of a lateral view of an apparatus for the manufacture of sheets of corrugated board of variable size, FIG. 2 is a plan view of the apparatus according to FIG. 1, and FIG. 3 is a plan view of a functional illustration of the change of width of the margins during a change of format.

DESCRIPTION OF THE PREFERRED EMBODIMENT

The apparatus of FIGS. 1 and 2 for the manufacture of sheets of corrugated board is described in the following, seen in the conveying direction 1 of a web 2 of corrugated board, i.e. from the left to the right in the drawing. The web 2 of corrugated board is supplied by means of a heating and feeding arrangement 3 and then guided over a short transfer table 4. Between the heating and feeding arrangement 3 and the transfer table 4, a cross cutter (not shown) can be disposed, which would serve only to cut out waste from the web 2 of corrugated board at the start of, or during, production.

The transfer table 4 is followed by two longitudinal cutting arrangements 5, 6, which—referred to the conveying direction 1—are provided first with corrugating devices 7 followed by longitudinal cutters 8. The corrugating devices 7 and the longitudinal cutters 8 can be engaged with, of disengaged from, the web 2 of corrugated board, the corrugating devices 7 and longitudinal cutters 8 of only one longitudinal cutting arrangement 5 or 6 being in engagement with the web 2 of corrugated board during operation.

As seen in FIG. 3, the longitudinal cutting arrangement 6 is followed by a margin cutting arrangement 9, which comprises two cutting devices 10, 11 for cutting lateral margins 12, 13 of the corrugated board web 2. A discharge device 14, 15 for such a lateral margin 12 or 13 that has been cut off is allocated to the cutting devices 10, 11. As seen in FIG. 2, one cutting device 10 or 11 at a time is coupled with a discharge device 14 or 15, and that for instance on a common slide 16—as seen in FIG. 1. The cutting device 10 together with the discharge device 14 and the cutting device 11 together with the discharge device 15 are variable and adjustable at right angles to the conveying direction 1 and, horizontally, in the direction of advance 17 marked by a double-headed arrow.

The functioning of the margin cutting arrangement 9 in cooperation with the longitudinal cutting arrangements 5, 6 is explained, taken in conjunction with FIG. 3. Of the two longitudinal cutting arrangements 5, 6, which can be combined to form a unit—as seen from FIGS. 1 and 2—use has so far been made of the backward longitudinal cutting arrangement 6—seen in the conveying direction 1. Its longitudinal cutters 8 have cut the corrugated board web 2 by longitudinal cuts 18 into four sectional webs 19a, 19b, 19c and 19d of corrugated board, the two outer sectional webs 19a and 19d being cut by means of the cutting devices 10, 11 of the margin cutting arrangement 9 such that they are provided with lateral edges 20a and 20d. For reasons of clarity, the illustration of FIG. 3 is chosen such that the corrugating devices 7 of the longitudinal cutting arrangement 6 have not been in engagement. In the case of the change of format width shown in FIG. 3, the longitudinal cutters 8 and the corrugating devices 7 of the longitudinal cutting arrangement 5 are adjusted to the new format widths before the change of size. During the actual change of size—while the corrugated board web 2 continues to be conveyed—the longitudinal cutters 8 of the longitudinal cutting arrangement 6 are disengaged from the corrugated board web 2 so that they do not cut any longer. This is why the longitudinal cuts 18 are shown to move off to the right in FIG. 3. The longitudinal cutters 8 and in this case also the corrugating devices 7 of the longitudinal cutting arrangement 5 are advanced toward the web 2 of corrugated board, i.e. they are moved into engagement with the latter, whereby longitudinal cuts 21 of a different position are produced in the web 2 of corrugated board, so that now sectional webs 22a, 22b, 22c and 22d of corrugated board of a format width from that cut before. The sectional webs 22a to 22d are moreover provided with corrugations 23 extending in the conveying direction 1.

In the portion 24 of change of format width of the web 2 of corrugated board where the changeover takes place from the sectional webs 19a to 19d, to the sectional webs 22a to 22d, the cutting devices 10 and 11, which are permanently in engagement with the web 2 of corrugated board, are adjusted in the direction of advance 17, and along with them the discharge devices 14 and 15, without being disengaged from the web 2 of corrugated board during this adjustment. They are moved into a position in which they cut the lateral edges 25a and 25d of the two outer sectional webs 22a and 22d in the correct position. Since the adjustment of the cutting devices 10, 11 takes place during the engagement with the web 2 of corrugated board and during the latter's conveyance at full, i.e. normal, operating speed, the lateral margins 12, 13 are cut off permanently without interruption and taken by the discharge devices 14, 15, which may be conventional suction appliances. Since the discharge devices 14, 15 can be adjusted together with the cutting devices 10, 11, such an adjustment, i.e. a change of width of the lateral margins 12, 13, does not cause irregularities in their discharging operation. The portion 24 of change of format width of the web 2 of corrugated board or of the sectional webs 19a to 19d and 22a to 22d is subsequently cut out as waste. As seen in FIG. 3—the longitudinal cuts 18 or 21, respectively, can be arranged such that an integral portion of the corrugated board web 2, which is not divided longitudinally, remains between them; but they may also overlap each other.

The cutting devices 10 and 11 may be coupled to the discharge devices 14 and 15 electrically, instead of mechanically, for instance by sequence-control drives. For reasons of clarity, the drives of the cutting devices 10 and 11 and of the longitudinal cutter 8 and the corrugating devices 7 are not shown.

The web 2 of corrugated board divided into sectional webs is supplied via a transfer table 26 to a cross cutter 27, where the portion 24 of change of format width of the web 2 of corrugated board is cut out of the latter by means of two cuts. This simple, so-called short cross cutter 27 is followed by a sheet sluice 28, by means of which such a waste sheet is discarded and carried away in a refuse tank 29.

The sheet sluice 28 is followed by a switch 30, where the sectional webs 19a to 19d and 22a to 22d, respectively, are distributed in accordance with the desired format length to be cut. Via two transfer tables 31, 32, one arranged on top of the other, they are then supplied to a so-called duplex cross cutting arrangement 33 comprising, associated in couples, two pairs of feed rollers 34a, 34b, two pairs of cutter rolls 35a, 35b and two pairs of delivering rollers 36a, 36b. The cutter rolls 35a cut sectional webs into sheets of a format length other than the cutter rolls 35b.

The duplex cross cutter 33 is followed by sheet stacker plates 37a, 37b, by means of which the sheets of corrugated board coming from the cutter rolls 35a and from the cutter rolls 35b are separately discharged, there being the possibility to distribute the corrugated board sheets of identical format length discharged by each stacker plate 37a or 37b, respectively, according to their different format widths and to deposit them in different sheet boxes.

What is claimed is:

1. An apparatus for the manufacture of sheet of corrugated board of variable size, comprising at least one longitudinal cutting arrangement (5, 6) having longitudinal cutters (8) adjustable at right angles to a conveying direction (1) of a nondivided web (2) of corrugated board for cutting sectional webs (19a to 19d; 22a to 22d) of corrugated board of differing format width, cutting devices (10, 11) adjustable at right angles to the conveying direction (1) of said web (2) of corrugated board for cutting lateral margins (12, 13) of said web (2) of corrugated board, discharge devices (14, 15) for said lateral margins (12, 13) and at least one cross cutting arrangement (33) for cutting sheets of corrugated board from said sectional webs (19a to 19d; 22a to 22d) of corrugated board, wherein, seen in the conveying direction (1), a cross cutter (27) for severing all said sectional webs (19*a* to 19*d*; 22*a* to 22*d*) of corrugated board and not said lateral margins is disposed downstream of the at least one longitudinal cutting arrangement (5, 6), the cutting devices (10, 11) for cutting lateral margins (12, 13) and the discharge devices (14, 15) and upstream of the at least one cross cutting arrangement (33) for the cutting of sheets of corrugated board, wherein in the conveying direction (1), the cross cutter (27) is followed by a switch (30) for distributing sectional webs (19*a* to 19*d*; 22*a* to 22*d*) of corrugated board of differing format lengths, said switch (30) being followed by the cross cutting arrangement which includes a duplex cross cutting arrangement (33) for the cutting of sheets of corrugated board from the sectional webs (19*a* to 19*d*; 22*a* to 22*d*) of corrugated board, wherein seen in the conveying direction (1) a sheet sluice (28), by means of which a portion (24) of change of format width of said web (2) of corrugated board is cut out of said web (2) by means of two cuts of said cross cutter (27), is discarded and carried away and is disposed downstream of said cross cutter (27) and upstream of the switch (30) for distributing sectional webs (19*a* to 19*d*; 22*a* to 22*d*) of corrugated board of different format lengths, wherein said apparatus does not include a cross cutter for said lateral margins.

2. An apparatus according to claim 1, wherein the cutting devices (10, 11) for the cutting of the margins (12, 13) of the web (2) of corrugated board are displaceable at right angles to the conveying direction (1) of the web (2) of corrugated board independently of the longitudinal cutters (8) for cutting the sectional webs (19*a* to 19*d*; 22*a* to 22*d*) of corrugated board and wherein they are permanently in engagement with the web (2) of corrugated board at least during the change of format width.

3. An apparatus according to claim 1, wherein the discharge devices (14, 15) for the margins (12, 13) are displaceable at right angles to the conveying direction (1) of the web (2) of corrugated board and wherein one cutting device of the cutting devices (10, 11) at a time for cutting a margin (12, 13) is coupled with a discharge device (14, 15).

4. An apparatus according to claim 3, wherein said one cutting device (10, 11) at a time for cutting a margin (12, 13) is mechanically coupled with a discharge device.

* * * * *